(12) United States Patent
Pettingill et al.

(10) Patent No.: US 6,880,375 B1
(45) Date of Patent: Apr. 19, 2005

(54) WHEEL LOCK DEVICE

(76) Inventors: Andrea L. Pettingill, 1043 N. 1140 West, Layton, UT (US) 84041; Blaine C. Pettingill, 1043 N. 1140 West, Layton, UT (US) 84041

( * ) Notice: Subject to any disclaimer, the term of this patent is extended or adjusted under 35 U.S.C. 154(b) by 0 days.

(21) Appl. No.: 10/618,942

(22) Filed: Jul. 15, 2003

(51) Int. Cl.[7] .............................................. B60R 25/00
(52) U.S. Cl. ........................................... 70/226; 70/18
(58) Field of Search ............................ 70/256, 237, 18, 70/19, 259, 225, 441, 395, 226

(56) References Cited

U.S. PATENT DOCUMENTS

| | | | |
|---|---|---|---|
| 4,819,462 A | 4/1989 | Apsell | |
| 4,833,442 A * | 5/1989 | Von Heck | 340/427 |
| 5,134,868 A * | 8/1992 | Bethards | 70/18 |
| 5,301,527 A | 4/1994 | Pollard | |
| 5,315,848 A * | 5/1994 | Beyer | 70/18 |
| 5,375,442 A | 12/1994 | Hammer | |
| 5,410,897 A | 5/1995 | Edmondson | |
| 5,463,885 A | 11/1995 | Warren, Sr. | |
| 5,613,385 A * | 3/1997 | Yamabe | 70/226 |
| 5,689,981 A * | 11/1997 | DeLuca et al. | 70/226 |
| 5,836,185 A * | 11/1998 | Openiano | 70/209 |
| 6,112,560 A * | 9/2000 | Mabee | 70/14 |
| 6,553,797 B1 * | 4/2003 | Witchey | 70/209 |

* cited by examiner

Primary Examiner—John B. Walsh

(57) ABSTRACT

A wheel lock device includes an elongated member having a first end and a second end. A first arm is attached to and orientated perpendicular to the elongated member. The first arm is positioned adjacent to the first end. A foot is attached to a free end of the first arm. A sleeve is positioned on the elongated member. An urging member is mounted in the sleeve for selectively biasing the sleeve against the elongated member. A second arm is attached to an outer surface of the sleeve and extends in a same direction as the first arm. A foot is attached to a free end of the second arm. The first and second legs may be selectively extended into openings in a wheel rim and the second leg moved away from the first leg such that the first and second legs engage the rim.

6 Claims, 4 Drawing Sheets ly colored a relatively bright color such as yellow.
WHEEL LOCK DEVICE

BACKGROUND OF THE INVENTION

1. Field of the Invention

The present invention relates to security and wheel locking devices and more particularly pertains to a new security and wheel locking device for preventing the proper rotation of a wheel.

2. Description of the Prior Art

The use of security and wheel locking devices is known in the prior art. While these devices fulfill their respective, particular objectives and requirements, the need remains for a device that includes a device which is easily couplable to a wheel rim for preventing the theft of a vehicle or trailer to which the rim is attached.

SUMMARY OF THE INVENTION

The present invention meets the needs presented above by generally including an elongated member having a first end and a second end. The elongated member has a first side and a second side positioned opposite of each other. A first arm is attached to the first side and extends away therefrom. The first arm is orientated generally perpendicular to the elongated member. The first arm is positioned adjacent to the first end. A foot is attached to a free end of the first arm. The foot extends in a same direction as the first end. A sleeve is positioned on the elongated member and is selectively movable between the first end and the second end. The sleeve has an upper wall, a bottom wall, an inner wall and an outer wall. The inner wall is positioned adjacent to the first side. An urging member is mounted in the outer wall for selectively biasing the outer wall away from the elongated member. A second arm is attached to an outer surface of the inner wall and extends in a same direction as the first arm. A foot is attached to a free end of the second arm. The foot extends in a same direction as second end. The first and second legs may be selectively extended into openings in a wheel rim and the second leg moved away from the first leg such that the first and second legs engage the rim.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
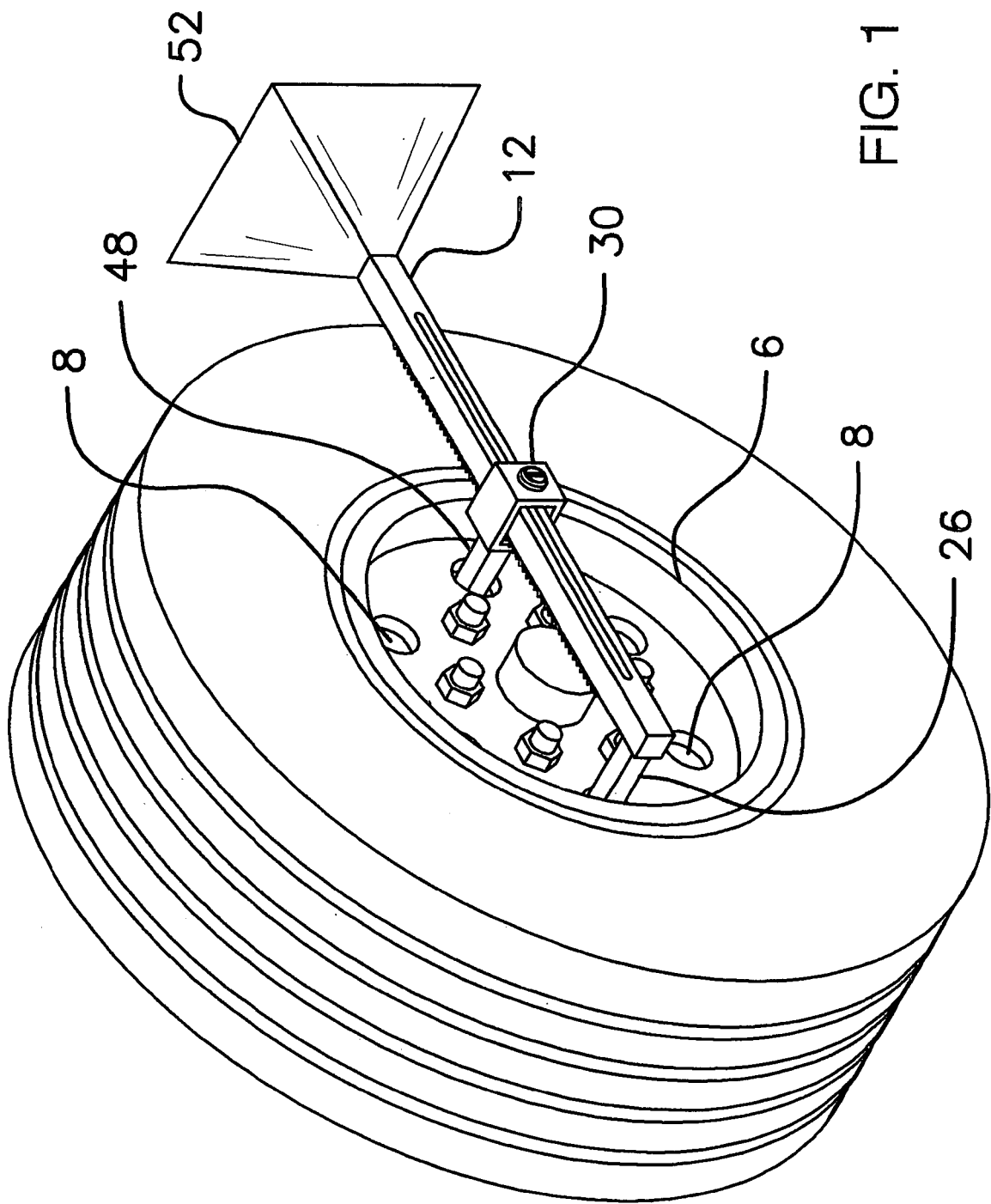
FIG. 1 is a schematic perspective in-use view of a wheel lock device according to the present invention.
Figure 2:
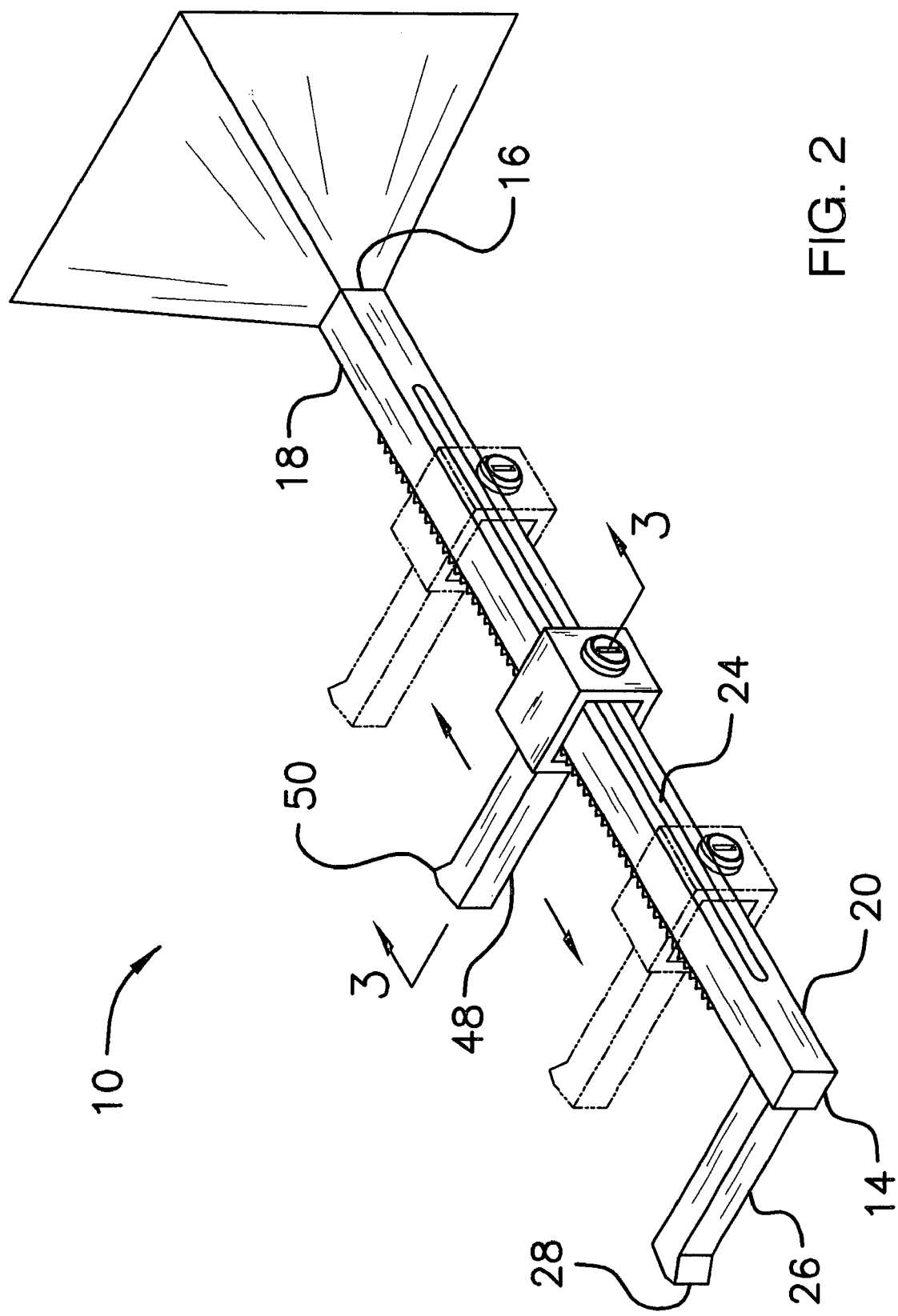
FIG. 2 is a schematic perspective view of the present invention.
Figure 3:
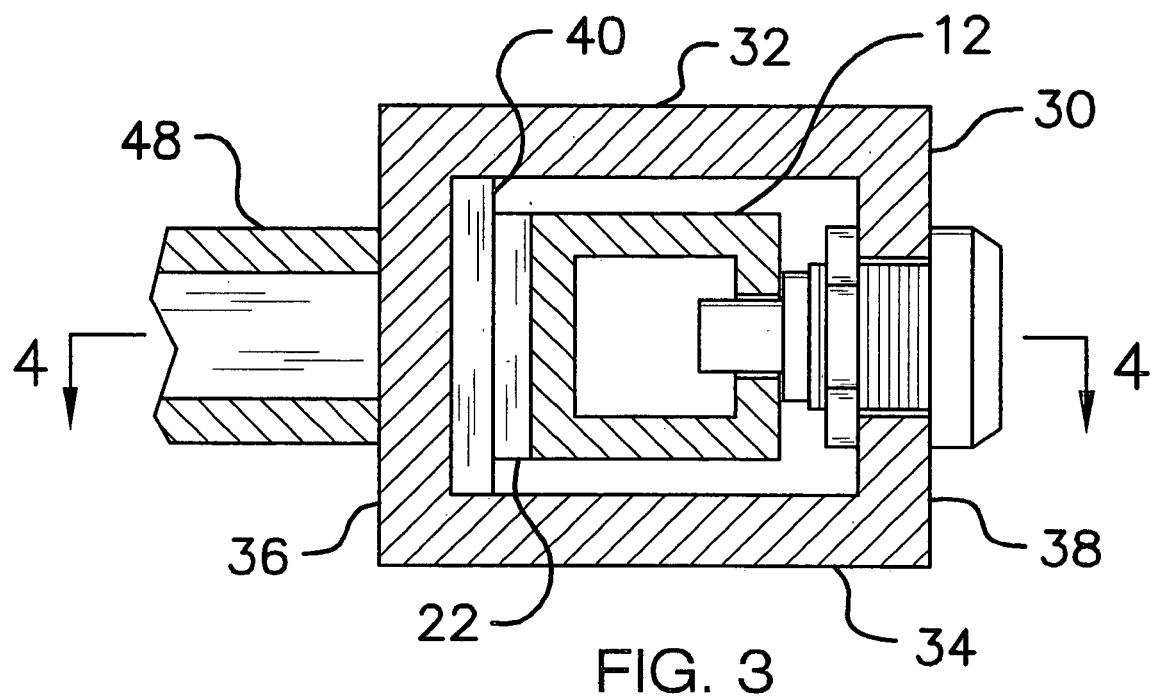
FIG. 3 is a schematic cross-sectional view taken along line 3—3 of FIG. 2 of the present invention.

With reference now to the drawings, and in particular to FIGS. 1 through 4 thereof, a new security and wheel locking device embodying the principles and concepts of the present invention and generally designated by the reference numeral 10 will be described.

As best illustrated in FIGS. 1 through 4, the wheel lock device 10 generally comprises an elongated member 12 having a first end 14 and a second end 16. The elongated member 12 has a first side 18 and a second side 20 positioned opposite of each other. The first side 18 has a plurality of teeth 22 positioned thereon. The teeth 22 are orientated perpendicular to a longitudinal axis of the elongated member 12. The second side 20 has an elongated slot 24 therein extending between the first 14 and second 16 ends.

A first arm 26 is attached to the first side 18 and extends away therefrom. The first arm 26 is orientated generally perpendicular to the elongated member 12. The first arm 26 is positioned adjacent to the first end 14. A foot 28 is attached to a free end of the first arm 26. The foot 28 extends in a same direction as the first end 14.

A sleeve 30 is positioned on the elongated member 12 and is selectively movable between the first end 14 and the second end 16. The sleeve 30 has an upper wall 32, a bottom wall 34, an inner wall 36 and an outer wall 38. The inner wall 36 is positioned adjacent to the first side 18. The inner wall 36 has an inner surface that has a plurality of teeth 40 thereon.

Figure 4A:
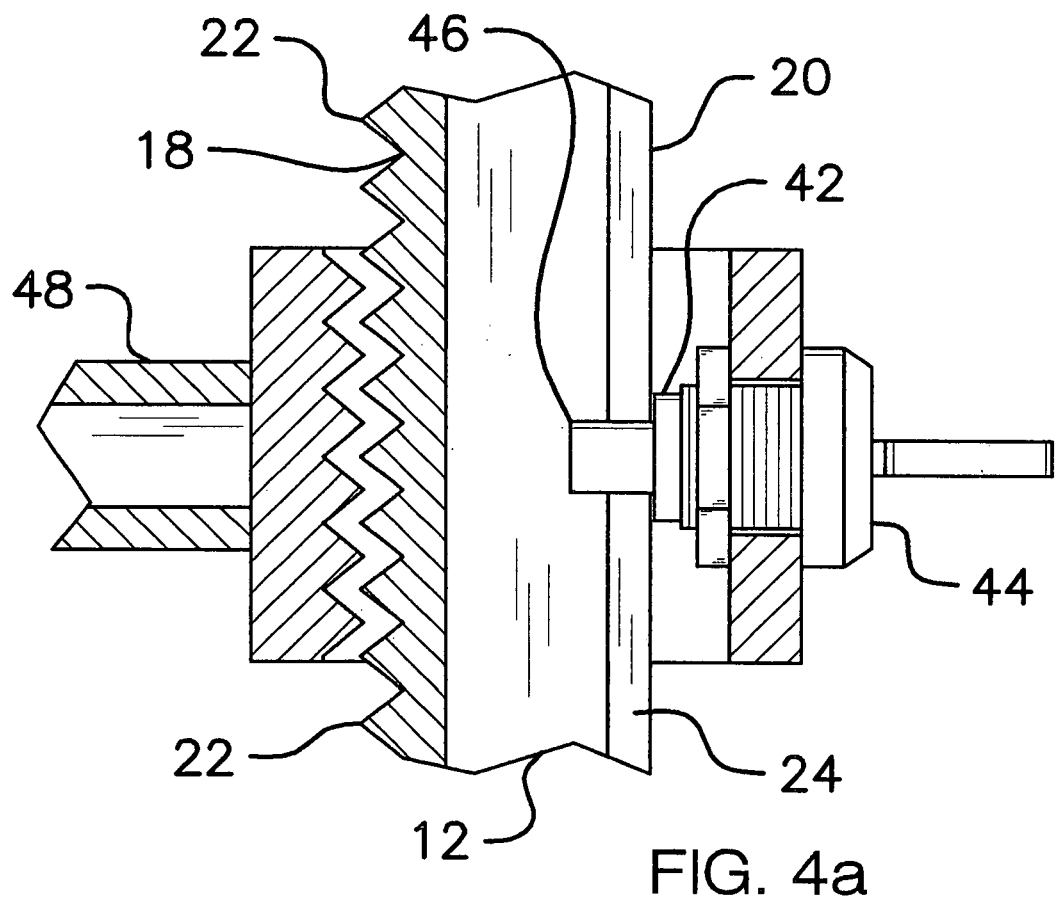
FIG. 4a is a schematic cross-sectional view taken along line 4—4 of FIG. 3 of the present invention showing the device in the unlocked position.
Figure 4B:
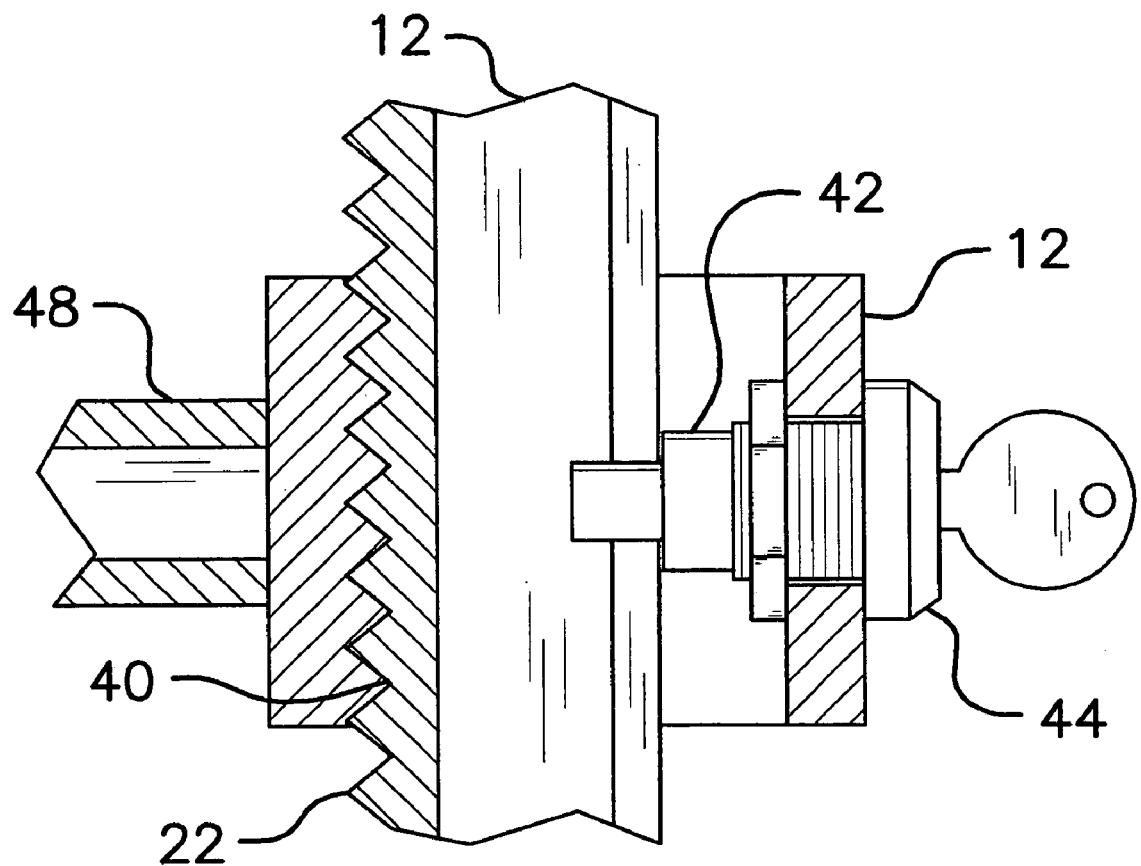
FIG. 4b is a schematic cross-sectional view taken along line 4—4 of FIG. 3 of the present invention showing the device in locked position.

An urging member 42 is mounted in the outer wall 38 for selectively biasing the outer wall 38 away from the elongated member 12. The urging member 42 is positionable in an extended position (FIG. 4b) or a retracted position (FIG. 4a). A lock 44 is mechanically coupled to the urging member 42 for selectively locking the urging member 42 in the extended position. A guide 46 is attached to the outer wall 38. The guide 46 extends into the slot 24. The teeth 22 on the first side 18 engage the teeth 40 on the inner surface of the inner wall 36 when the urging member 42 is in the extended position.

A second arm 48 is attached to an outer surface of the inner wall 36 and extends in a same direction as the first arm 26. A foot 50 is attached to a free end of the second arm 48. The foot 50 extends in a same direction as second end 16 such that the two feet 28, 50 extend in opposite directions with respect to each other.

A weight 52 is attached to the second end 16 of the elongated member 12. The weight 52 is preferably a large mass. The elongated member 12 and the weight 52 are preferably colored a relatively bright color such as yellow.

In use, the first 26 and second 48 legs may be selectively extended into openings 8 in a wheel rim 6 and the second leg 48 moved away from the first leg 26 such that the first 26 and second 48 legs engage the rim 6. The feet 28, 50 hold the elongated member 12 in place. The urging member 42 is extended so that the teeth 40 on the sleeve 30 engage the teeth 22 on the elongated member 12 so that the sleeve 30 is immovable with respect to the elongated member 12. The lock 44 retains the urging member 42 in the extended position. Preferably, the urging member 42 is moved into the extended position as the lock 44 is rotated. Once in place, the device 10 prevents the proper rotation of the rim 6. The weight 52 further displaces the proper rotational abilities of the rim 6 and will strike the ground should the rim 6 be rotated. If the weight 52 is broken off from the elongated member 12, the elongated member 12 will still be attached to the rim 6 and an observer would recognize that the vehicle or trailer on which the rim 6 is positioned is stolen.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A wheel lock device for selectively locking on a wheel rim, said device comprising:
    an elongated member having a first end and a second end, said elongated member having a first side and a second side positioned opposite of each other, said first side having a plurality of teeth positioned thereon;
    a first arm being attached to said first side and extending away therefrom, said first arm being orientated generally perpendicular to said elongated member, said first arm being positioned adjacent to said first end, a foot being attached to a free end of said first arm, said foot extending in a same direction as said first end;
    a sleeve being positioned on said elongated member and being selectively movable between said first end and said second end, said sleeve having an upper wall, a bottom wall, an inner wall and an outer wall, said inner wall being positioned adjacent to said first side, said inner wall of said sleeve having an inner surface having a plurality of teeth thereon;
    an urging member being mounted in said outer wall for selectively biasing said outer wall away from said elongated member;
    a second arm being attached to an outer surface of said inner wall and extending in a same direction as said first arm, a foot being attached to a free end of said second arm, said foot extending in a same direction as second end; and
    each of said first and second arms being selectively extendable into openings in the wheel rim and said second arm being selectively movable away from said first arm such that said first and second arms releasably engage the rim.

2. The wheel lock device of claim 1, wherein said urging member being positionable in an extended position or a retracted position, said teeth on said first side engaging said teeth on said inner surface of said inner wall when said urging member is in said extended position.

3. The wheel lock device of claim 2, further including a lock being mechanically coupled to said urging member for selectively locking said urging member in said extended position.

4. The wheel lock device of claim 2, said second side having an elongated slot therein extending between said first and second ends, a guide being attached to said outer wall, said guide extending into said slot.

5. The wheel lock device of claim 2, further including a weight being attached to said second end of said elongated member.

6. A wheel lock device for selectively locking on a wheel rin, said device comprising:
    an elongated member having a first end and a second end, said elongated member having a first side and a second side positioned opposite of each other, said first side having a plurality of teeth positioned thereon, said second side having an elongated slot therein extending between said first and second ends;
    a first arm being attached to said first side and extending away therefrom, said first arm being orientated generally perpendicular to said elongated member, said first arm being positioned adjacent to said first end, a foot being attached to a free end of said first arm, said foot extending in a same direction as said first end;
    a sleeve being positioned on said elongated member and being selectively movable between said first end and said second end, said sleeve having an upper wall, a bottom wall, an inner wall and an outer wall, said inner wall being positioned adjacent to said first side, said inner wall having an inner surface having a plurality of teeth thereon;
    an urging member being mounted in said outer wall for selectively biasing said outer wall away from said elongated member, said urging member being positionable in an extended position or a retracted position, a lock being mechanically coupled to said urging member for selectively locking said urging member in said extended position, a guide being attached to said outer wall, said guide extending into said slot, said teeth on said first side engaging said teeth on said inner surface of said inner wall when said urging member is in said extended position;
    a second arm being attached to an outer surface of said inner wall and extending in a same direction as said first arm, a foot being attached to a free end of said second arm, said foot extending in a same direction as second end;
    a weight being attached to said second end of said elongated member; and
    each of said first and second arms being selectively extendable into openings in the wheel rim and said second arm being selectively movable away from said first arm such that said first and second arms releasably engage the rim.

* * * * *